United States Patent [19]

Kawamura

[11] Patent Number: 4,886,978
[45] Date of Patent: Dec. 12, 1989

[54] EXHAUST ENERGY RECOVERY APPARATUS FOR ENGINE

[75] Inventor: Hideo Kawamura, Samukawa, Japan

[73] Assignee: Isuzu Motors Limited, Tokyo, Japan

[21] Appl. No.: 200,583

[22] Filed: May 31, 1988

[30] Foreign Application Priority Data

May 30, 1987 [JP]  Japan ................................ 62-133454

[51] Int. Cl.⁴ .............................................. F02G 5/00
[52] U.S. Cl. ........................................ 290/52; 60/597
[58] Field of Search ..................... 290/52; 60/597, 602, 60/605, 608

[56] References Cited

U.S. PATENT DOCUMENTS

| | | | |
|---|---|---|---|
| 4,038,558 | 7/1977 | Gallois | 290/52 |
| 4,672,814 | 6/1987 | Abo et al. | 60/602 |
| 4,694,653 | 9/1987 | Kawamura | 290/52 X |
| 4,694,654 | 9/1987 | Kawamura | 290/52 X |
| 4,769,993 | 9/1988 | Kawamura | 290/52 X |

Primary Examiner—William M. Shoop, Jr.
Assistant Examiner—W. E. Duncanson, Jr.
Attorney, Agent, or Firm—Staas & Halsey

[57] ABSTRACT

An exhaust energy recovery apparatus for an engine has an induction generator drivable by exhaust gases emitted from the engine, and an induction motor drivable by electric power generated by the induction generator. The frequency of an exciting current supplied to the induction generator and the load being the induction motor are controlled so that the operation efficiency of the turbine will be maximized.

9 Claims, 4 Drawing Sheets

EXHAUST ENERGY RECOVERY APPARATUS FOR ENGINE

BACKGROUND OF THE INVENTION

The present invention relates to an exhaust energy recovery apparatus for an engine mounted on a motor vehicle and, more particularly to an exhaust energy recovery apparatus for an engine, including a turbine disposed in an exhaust system of the engine and drivable with maximum efficiency.

There have been developed in recent years ceramic internal combustion engines having various components made of ceramic. Since the ceramic engines are not required to be cooled, it is expected to increase the thermal efficiency of these engines by recovery the energy of high-temperature exhaust gases from the engines and feeding the recovered energy back to the drive power transmitting system.

One conventional exhaust energy recovery engine which has been developed is a so-called turbocompound engine including a turbine disposed in an engine exhaust system for producing rotative power which is directly fed back to the output shaft of the engine through a speed reducer. The turbocompound engine is however disadvantageous in that it requires a speed reducer of a very high speed reduction ratio capable of matching the high rotational speed of the turbine with the rotational speed of the engine, and that the entire apparatus is large in size and the power transmission efficiency is low.

In view of the aforesaid drawbacks, the inventors have developed an exhaust energy recovery apparatus for an engine, which, rather than feeding the rotative drive power of a turbine directly back to the output shaft of the engine through a mechanical mechanism, drives a generator with the turbine and supplies generated electric power to a motor in the power transmitting system of the engine so as to feed back the generated power as drive power. Such a developed apparatus is disclosed in Japanese Laid-Open Publication No. 58-214615, for example.

The foregoing exhaust energy recovery apparatus for an engine is however arranged to operate without checking output conditions of the engine which vary at all times dependent on the running conditions of the motor vehicle. Therefore, the earlier exhaust energy recovery apparatus is not designed to operate the turbine with best efficiency at all times.

SUMMARY OF THE INVENTION

It is an object of the present invention to provide an exhaust energy recovery apparatus for an engine mounted on a motor vehicle, which checks output conditions of a turbine at all times, being driven by the exhaust gases of the engine, so that the turbine can be operated with maximum efficiency.

Another object of the present invention is to provide an exhaust energy recovery apparatus for an engine, which can operate, with maximum efficiency, an induction motor that is driven by a turbine.

Still another object of the present invention is to provide an exhaust energy recovery apparatus for an engine, which can operate, with maximum efficiency, an induction motor which is driven by electric power generated by an induction generator.

According to the present invention, there is provided an exhaust energy recovery apparatus for an engine mounted on a motor vehicle, comprising a turbine drivable by exhaust gases emitted from the engine, an induction generator drivable by the turbine, an induction motor drivable by electric power generated by the induction generator, a battery mounted on the motor vehicle, an inverter for converting DC electric power supplied from the battery into AC electric power to supply an exciting current to the induction generator, means for calculating operation and efficiency of the turbine based on signals from sensors for detecting operating conditions of the turbine, and control means for controlling the frequency of the exciting current supplied from the inverter to the induction generator and the load of the induction motor so that the operation efficiency of the turbine will be in the vicinity of maximum efficiency.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
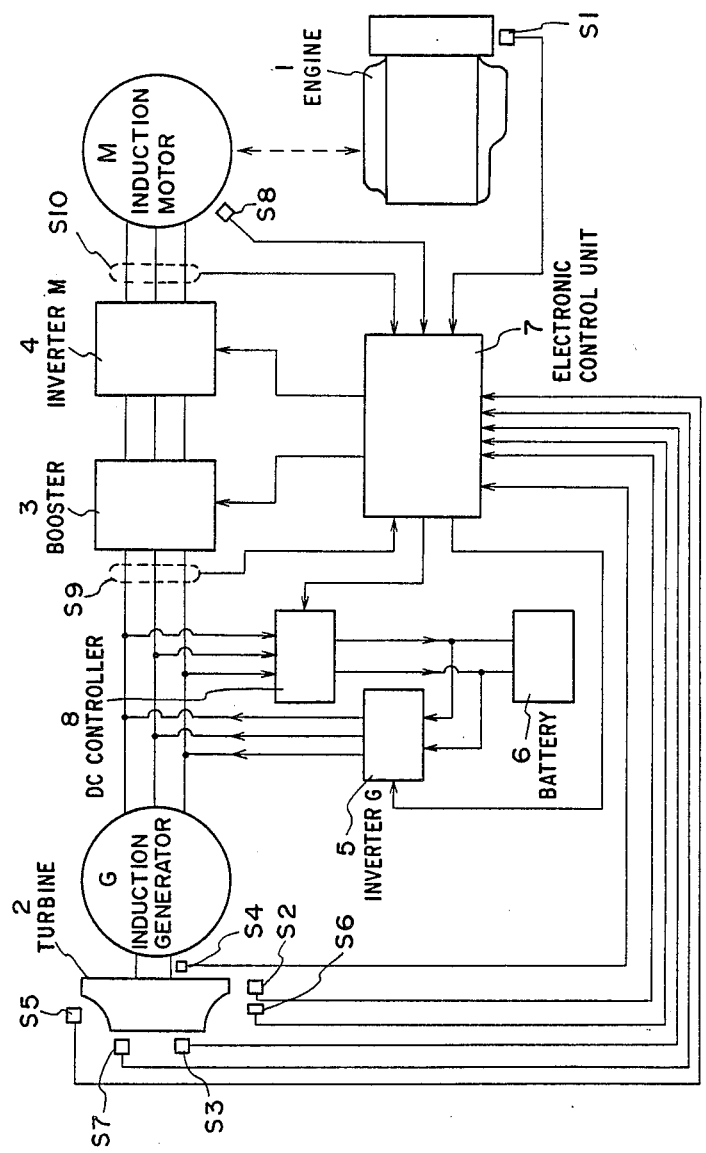
FIG. 1 is a block diagram of an exhaust energy recovery apparatus for an engine according to the present invention.

FIG. 1 shows in block form an exhaust energy recovery apparatus for an engine mounted on a motor vehicle according to the present invention. As shown in FIG. 1, an internal combustion engine 1 has an exhaust system such as an exhaust manifold, for example, in which there is disposed a turbine 2 which is drivable by the energy of exhaust gases emitted from the engine 1. The turbine 2 has a rotatable shaft on which an induction generator G (three-phase AC generator in the illustrated embodiment) is mounted. Electric power generated by the induction generator G is supplied through a booster 3 and an inverter M (4) to an induction motor (three-phase induction motor M in the illustrated embodiment), or applied to charge a vehicle mounted battery 6 through a DC controller 8. The induction motor M is coupled to a power transmission system (for example, the output shaft of the engine or the drive axle of a road wheel) of the motor vehicle. When the motor vehicle is under such running conditions which require greater drive power as when running uphill or for acceleration, the output of the induction motor M is applied to assist in increasing the output power of the engine 1. When higher drive power is not necessary as during idling or running at low speed, electric power generated by the induction generator G is applied to charge the battery 6 through the DC controller 8 which has a rectifier and a duty factory control unit.

The inverter M (4) serves to convert the generated electric power supplied from the induction generator G via the booster 3 into AC electric power having a prescribed frequency at which the induction motor M operates with maximum efficiency. The rotational speed of the induction motor M is regulated by the electric power at such a prescribed frequency to provide a desired amount of slip, so that the generated electric power supplied from the induction generator G can efficiently be converted into a mechanical output. Thus, the load of the induction generator G can be controlled in a wide range.

An inverter G (5) serves to convert DC electric power supply from the battery 6 into AC electric power to produce exciting electric power for the induction generator G. Even if the rotational speed of the induction generator G driven by the exhaust energy which varies dependent on the running conditions of the motor vehicle fluctuates, the inverter G (5) varies the frequency of the exciting electric power dependent on the rotational speed, so that the generation efficiency of the induction generator G will be in the vicinity of best efficiency at all times.

Designated at S1 is an engine speed sensor for detecting the rotational speed of the engine 1, S2 a turbine inlet temperature sensor for detecting the temperature of exhaust gases introduced into the turbine 2, S3 a turbine outlet temperature sensor for detecting the temperature of exhaust gases discharged from the turbine 2, S4 a turbine speed sensor for detecting the rotational speed of the turbine 2, S5 an exhaust gas speed sensor for detecting the speed of flow of exhaust gases, S6 a turbine inlet pressure sensor for detecting the pressure of exhaust gases introduced into the turbine 2, S7 a turbine outlet pressure sensor for detecting the pressure of exhaust gases discharged from the turbine 2, S8 a motor speed sensor for detecting the rotational speed of the induction motor M, S9 a first voltage detecting means for detecting the voltage of electric power generated by the induction generator G and applied to the booster 3, and S10 a second voltage detecting means for detecting the voltage of electric power applied by the inverter M (4) to the induction motor M.

An electronic control unit 7 comprising a microcomputer receives signals from the sensors S1 through S6 and a signal indicative of the output electric power from the induction generator G, and applies control signals to the booster 3, the inverter M (4), the inverter G (5), and the DC controller 8.

In FIG. 1, an electric power output circuit of the induction generator G, has connected thereto a phase advance regulating circuit comprising a phase advancer capacitor (not shown) with its electrostatic capacity controllable according to the load condition for improving the power factor.

In the block diagram of FIG. 1, only the induction generator G is coupled to the rotatable shaft of the turbine 2. However, a turbocharger may be arranged which has its compressor wheel mounted on the rotatable shaft of the turbine 2 for supercharging the intake system of the engine 1.

Figure 2:
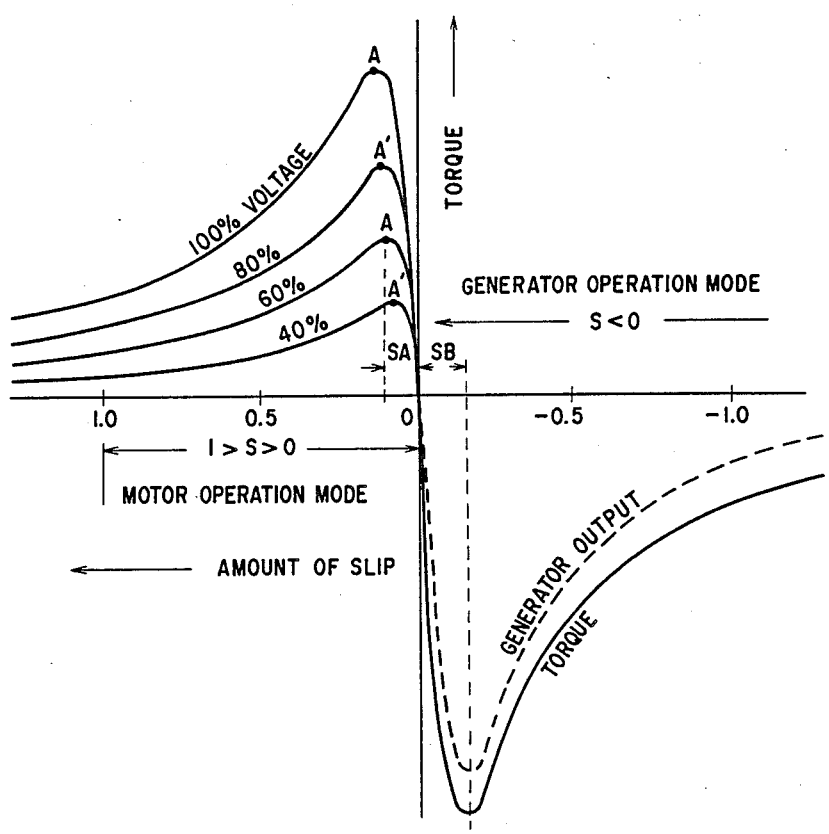
FIG. 2 is a diagram showing speed vs. torque curves of an induction rotary machine.

FIG. 2 is a diagram of speed vs. torque curves of an induction rotary machine. The graph shows a range $$1 < S < 0 < S$$

where S indicates the amount of slip.

In a motor operation mode shown in FIG. 2, the torque varies in proportion to the square of the supplied voltage. When the amount of slip S from a synchronous rotational speed increases from 0, the torque at each supplied voltage sharply increases up to a maximum torque level, after which the torque decreases. Therefore, in order to achieve a point A where the maximum torque is produced by the induction motor at 60% voltage supplied, the speed of the motor is reduced from the synchronizing rotational speed by an amount of slip SA. Since operation of an motor with a amount of slip at the maximum torque level is unstable, however, the motor is actually operated with a slightly lesser amount of slip.

In a generator operation mode, as the amount of slip varies from 0 to −1.0, the torque applied to the rotatable shaft increases until the amount of slip reaches a prescribed amount of slip SB, and so does the output of the generator. Beyond the prescribed amount of slip SB, however, the generator output is lowered.

In order to vary the amount of slip SB in such rotational speed control for the induction motor, the load on the induction generator should be varied. If the frequency of the AC exciting electric power for the induction generator is varied, the synchronous speed of the AC machine is varied, and the amount of slip S from the synchronous speed is also varied even if the rotational speed of the rotor remains unchanged. Accordingly, the amount of slip S can freely be adjusted by regulating the exciting frequency.

According to the present embodiment, therefore, in controlling the rotation of the turbine 2, the amount of slip of the induction generator G is controlled by controlling the induction motor M which serves as the load on the induction generator G and by controlling the exciting frequency produced by the inverter G (5). Thereby a load is imposed on the rotation of the turbine 2 coaxial with the induction generator G, so that the best turbine efficiency will be in the vicinity of the amount of slip SB of the induction generator G.

Figure 3:
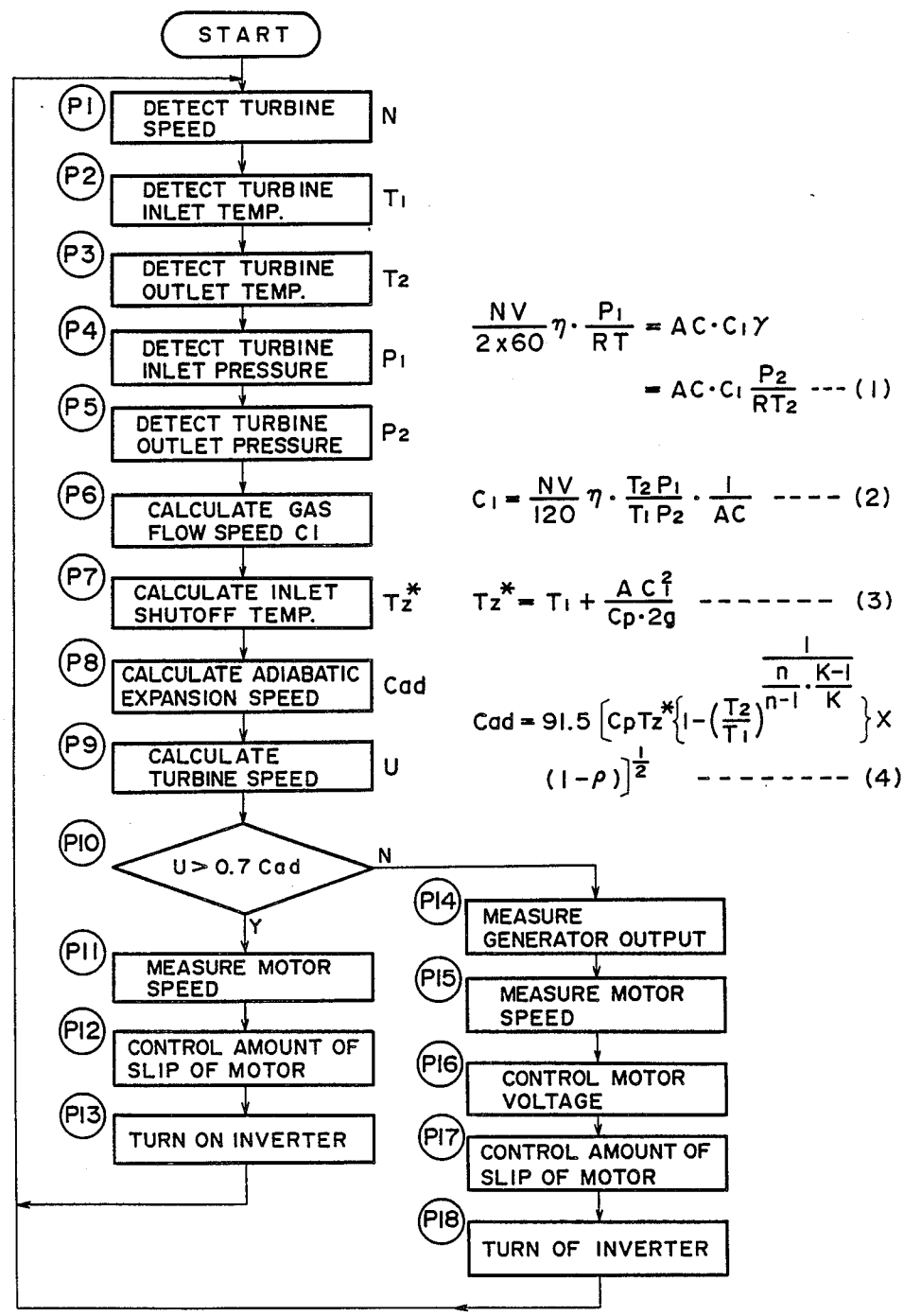
FIG. 3 is a flow chart of operation for the exhaust energy recovery apparatus according to the present invention.

FIG. 3 is a flowchart showing, by way of example, operation of the apparatus of the invention. Operation of the exhaust energy recovery apparatus of the present invention will be described with reference to FIG. 3.

In steps P1 through P5, a turbine rotational speed N, a turbine inlet temperature T1, a turbine outlet temperature T2, a turbine inlet pressure P1, and a turbine outlet pressure P2 are detected respectively by the turbine speed sensor S4, the turbine inlet temperature sensor S2, the turbine outlet temperature S3, the turbine inlet pressure sensor S6, and the turbine outlet pressure sensor S7. Then, the gas flow speed C1 of exhaust gases is calculated in a step P6. The gas flow speed C1 is determined from the following equations:

$$\{(N \cdot V)/(2 \times 60)\} \cdot \eta \cdot (P1/RT1) = AC \cdot Cl \cdot \gamma = AC \cdot Cl \cdot (P2/RT2) \tag{1}$$

$$Cl = \{(N \cdot V)/120\} \cdot \eta \cdot \{(T2 \cdot P1)/(T1 \cdot P1)\} \cdot (1/AC) \tag{2}$$

where T1 is the turbine inlet temperature, P1 is the turbine inlet pressure, T2 is the turbine outlet temperature, P2 is the turbine outlet pressure, V is the volumetric flow rate of the turbine, N is the r.p.m. of the turbine, R a constant of the exhaust gases, AC is a constant of the passage area and the speed, and $\gamma$ is the specific gravity. The exhaust gas flow speed C1 may be detected by the exhaust gas speed sensor S5.

In step P7, an inlet shutoff temperature Tz* is calculated according to the following equation (3):

$$Tz^* = T1 + \{(A \cdot Cl^2)/(Cp \cdot 2\ g)\} \tag{3}$$

where Cp is the average constant-pressure specific heat, and (A·Cl²)/2 g is the kinetic energy at a nozzle outlet. Then, an adiabatic expansion speed Cad is calculated in a step P8 according to the following equation:

$$Cad = 91.5[C_p T_z * \{1-(T2/T1)[1/\{(n/(n-1))((K-1)/K)\}]\}(1-p)]^{(\frac{1}{2})} \quad (4)$$

A step P9 calculates a turbine speed U based on the turbine rotational speed N and the dimensions of the turbine. The turbine speed U and the value Cad determined in the step P8 are compared in a step P10.

Figure 4:
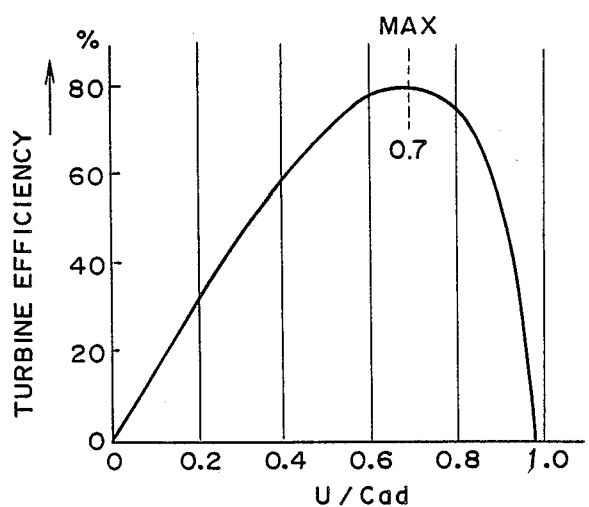
FIG. 4 is a diagram explaining turbine efficiency.

It is known that the turbine efficiency is optimum when U is of a value smaller than Cad and U/Cad=about 0.7, as shown in FIG. 4. If U is greater than 0.7 Cad, then control proceeds to steps P11 through P13, and if U is smaller than 0.7 Cad, then control goes to steps P14 through P18, so that the value of U approaches 0.7 Cad until U=0.7 Cad.

More specifically, the rotational speed of the induction motor M is measured by the motor speed sensor S6, and the synchronous speed corresponding to the frequency of the AC electric power supplied by the inverter M (4) and the present rotational speed are compared in a step P11. The output frequency of the inverter M (4) is controlled so that the difference (amount of slip) between the rotational speeds will become the amount of slip SA (at 60% voltage) with which the maximum torque can be produced by the induction motor, thereby operating the induction motor M efficiently. At this time, by controlling the booster 3 to supply a higher voltage to the induction motor M, as well as controlling the amount of slip, the electric power consumed by the induction motor M, i.e., the load on the induction generator G is increased (steps P12 and P13). Therefore, the rotational speed of the induction generator G is lowered due to the increased load thereon, and so is the rotational speed N of the turbine 2 coaxial with the induction generator G, whereupon control returns from the step P13 to the step P1.

Then, the flow sequence from the steps P1 through P9 is executed to achieve a turbine speed lower than the turbine speed U. This flow sequence is repeated to obtain a turbine speed U which is closer to 0.7 Cad.

If the turbine speed U is lower than 0.7 Cad in the step P10, control goes to step P14 through P18. The output power of the indication generator G is measured in a step P14, and then the rotational speed of the induction motor M is measured in a step P15. Thereafter, the voltage of electric power to be supplied to the induction motor M is regulated by the booster 3, the frequency thereof is regulated by the inverter M (4), and the amount of slip, i.e., the difference between the synchronous rotational speed corresponding to the frequency and the actual rotational speed is controlled to reduce the load on the induction generator G (steps P16 through P18).

After the amount of slip of the induction motor M has been controlled to reduce the load on the induction generator G, the increased turbine rotational speed is detected again in the step P1, and the flow sequence from the steps P2 through P9 is repeated to have the turbine speed U approach 0.7 Cad.

In the control of the amount of slip of the induction generator G, the frequency of exciting electric power is regulated by the inverter G (5) to control the rotation of the induction generator G, so that the amount of slip SB will be achieved for maximum power generation.

With the present invention, as described above, the efficiency of the exhaust turbine which varies at all times dependent on the running conditions of the motor vehicle, is calculated by the electronic control unit at all times, and the load on the induction generator coupled to the turbine and the exciting frequency for the induction generator are controlled to regulate the rotational speed of the turbine. Therefore, the turbine efficiency can always be set to a point near the optimum efficiency.

Since the induction motor is connected as a load for the induction generator, the output of the induction motor, i.e., the load on the induction generator coupled to the turbine shaft can freely be regulated by varying the voltage of electric power supplied to the electric motor and its frequency, so that better turbine efficiency can be obtained with ease.

Although a certain preferred embodiment has been shown and described, it should be understood that many changes and modifications may be made therein without departing from the scope of the appended claims.

What I claim is:

1. An exhaust energy recovery apparatus for an engine of a motor vehicle, comprising:
    a turbine connected to the engine drivable by exhaust gases emitted from the engine;
    sensors connected to said turbine, detecting operating conditions of said turbine and providing corresponding detection signals;
    an induction generator connected to said turbine and drivable by said turbine, providing generated electric power;
    an induction motor connected to said induction generator and drivable by the electric power generated by said induction generator;
    a battery connected to the engine providing DC electric power to the engine;
    an inverter connected to said binary and said induction generator, converting the DC electric power from said battery into AC electric power and providing the AC electric power as an exciting current having a frequency to said induction generator;
    means for calculating an operation efficiency of said turbine based on the detection signals from said sensors; and
    control means for controlling the frequency of the exciting current controlling said induction motor, thereby maintaining the calculated operation efficiency of said turbine at approximately maximum efficiency.

2. An exhaust energy recovery apparatus according to claim 1, further comprising a power transmission system, wherein said induction motor is connected to the power transmission system.

3. An exhaust energy recovery apparatus according to claim 1, wherein said control means comprises means for controlling the frequency of the exciting current and controlling said induction motor, varying an amount of slip of said induction motor and causing a generation efficiency of said induction generator to be substantially maximum.

4. An exhaust energy recovery apparatus according to claim 1, wherein said control means comprises a booster connected between said induction generator and said induction motor, regulating a voltage of the generated electric power.

5. An exhaust energy recovery apparatus according to claim 1, wherein said control means includes a second inverter connected between said induction generator and said induction motor controlling a frequency of the generated electric power and supplying the frequency controlled electric power to said induction motor, varying an amount of slip of said induction motor and causing an efficiency of said induction motor to be substantially maximum.

6. An exhaust energy recovery apparatus according to claim 1, further comprising a DC controller connected between said induction generator and said battery, receiving the generated electric power and charging said battery.

7. An exhaust gas energy recovery apparatus for an engine producing exhaust gas, comprising:
a turbine connected to the engine having an inlet, an outlet and being driven by the exhaust gas;
an induction generator connected to said turbine generating electric power and having a load; and
control means for detecting operating conditions of said turbine, maximizing operating efficiency of said turbine by controlling the load of said induction generator on the basis of the detected operating conditions of said turbine, said control means comprising:
detecting means for detecting turbine rotational speed, inlet temperature and pressure and outlet temperature and pressure;
calculating means for calculating a gas flow speed, an inlet shut-off temperature and an adiabatic expansion speed of the exhaust gas and a turbine speed, on the basis of detection by said detecting means.

8. An exhaust gas energy recovery apparatus according to claim 7, further comprising:
an induction motor connected to said induction generator, receiving the generated electric power and providing the load for said induction generator;
means for measuring a speed of said induction motor and controlling an amount of slip of said induction motor when the calculated turbine speed is greater than seven tenths of the calculated adiabatic expansion speed; and
means for measuring the generated electric power, measuring the speed of said induction motor and controlling the generated electric power received by said induction motor to control the amount of slip of said induction motor when the calculated turbine speed is less than seven tenths of the calculated adiabatic expansion speed.

9. A method of maximizing efficiency of a turbine having an inlet and outlet, being driven by a gas and driving a load, said method comprising the steps of:
detecting values of turbine rotational speed, inlet temperature, outlet temperature, inlet pressure, and outlet pressure;
calculating a gas flow speed on the basis of the detected values;
calculating an inlet shut-off temperature;
calculating an adiabatic expansion speed of the gas;
calculating a turbine speed; and
controlling the load to maximize efficiency of the turbine on the basis of one of, the calculated turbine speed being greater than seven tenths of the calculated adiabatic expansion speed and, the calculated turbine speed being less than seven tenths of the calculated adiabatic expansion speed.

* * * * *

UNITED STATES PATENT AND TRADEMARK OFFICE
CERTIFICATE OF CORRECTION

PATENT NO. : 4,886,978

DATED : December 12, 1989

INVENTOR(S) : Hideo Kawamura

It is certified that error appears in the above-identified patent and that said Letters Patent is hereby corrected as shown below:

Col. 1, line 16, "recovery" s/b --recovering--.

Col. 3, line 60, "1<S<0<S" s/b --1>S>0>S--.

Col. 4, line 5, "an" s/b --the--, "a" s/b --an--.

IN THE CLAIMS

Col. 6, line 41, "binary" s/b --battery--.

Signed and Sealed this

Sixteenth Day of April, 1991

Attest:

HARRY F. MANBECK, JR.

Attesting Officer

Commissioner of Patents and Trademarks